Patented Oct. 20, 1953

2,656,280

UNITED STATES PATENT OFFICE 2,656,280

STABILIZING CHROME ORES OF THE TRANSVAAL TYPE FOR REFRACTORY BRICK

Russell Pearce Heuer, Villanova, Pa., assignor to General Refractories Company, a corporation of Pennsylvania No Drawing. Application January 12, 1952, Serial No. 266,244

9 Claims. (Cl. 106—59)

The present invention relates to the manufacture of refractory brick by the use of chrome ore which has not heretofore been suitable for this purpose.

The present application is a continuation-in-part of copending application Serial No. 210,625, filed February 12, 1951, for Stabilizing Chrome Ores of Transvaal Type for Refractory Brick, now abandoned.

A purpose of the invention is to use a chrome ore having a spinel phase in which the mol ratio of the $Al_2O_3$ plus $Cr_2O_3$ content to the MgO content exceeds 1.75 (after removing silica).

A further purpose is to stabilize the ratio of $R_2O_3$ content to RO content which develops in such a chrome spinel after heating to a high temperature by bringing the chrome ore into contact with magnesia to permit absorption of magnesia by the chrome spinel.

A further purpose is to manufacture unfired refractory brick of chrome ore-containing spinel as set forth above in order to eliminate the natural shrinkage of the unfired refractory by corrective expansion in accordance with the present invention.

A further purpose is to obtain an improved strength at intermediate temperature of a unfired chromite refractory brick employing a spinel phase as above set forth.

A further purpose is to employ 80 to 20 percent of chrome ore having a mol ratio of $Al_2O_3$ plus $Cr_2O_3$ to MgO exceeding 1.75 after removing silica with 20 to 80 percent of MgO. The chrome ore, desirably to the extent of 50 to 80 percent of the brick (preferably 65 percent), will be employed as coarse particles between 6 and 28 mesh per linear inch, although magnesia coarse particles may permissibly be used, and the magnesia, desirably to the extent of 20 to 50 percent of the brick, will be employed as fine particles, although chrome fine particles may permissibly be used.

Further purposes appear in the specification and in the claims.

In the manufacture of refractory brick, the chrome ores generally employed, with their typical analyses, are as follows:

| | Cuban Ore | Phillipine Ore | Turkish Ore |
|---|---|---|---|
| | Percent | Percent | Percent |
| Ignition Loss | 0.00 | 0.11 | 0.20 |
| $SiO_2$ | 3.12 | 5.10 | 5.11 |
| FeO | 13.55 | 12.83 | 12.62 |
| $Al_2O_3$ | 28.51 | 29.07 | 16.80 |
| CaO | 0.09 | 0.17 | 0.31 |
| MgO | 17.50 | 19.20 | 18.37 |
| $Cr_2O_3$ | 37.23 | 32.90 | 46.22 |
| | 100.00 | 99.38 | 99.63 |

These chrome ores contain a principal phase having a spinel composition together with associated magnesium silicate impurities. If such chrome ore is subjected to the chemical action of sulphuric acid plus hydrofluoric acid and finally leached with dilute hydrochloric acid, the silicate phase or silica will be removed.

The silica removal method used in studying the chrome ores takes advantage of the easy decomposition of hydrous silicates and oxides by hydrofluoric acid and sulphuric acid in aqueous solutions without substantial effect on the chromite spinel. The silica reacts with the hydrofluoric acid to liberate silicon fluoride and leaves the other elements originally combined with the silica to react with the sulphuric acid to form sulphates. The sulphates are then dissolved in dilute hydrochloric acid and removed by washing by decantation. The chromite spinel, which for all practical purposes is not affected by these acids, is dried and heated gently to about 200 to 300° C. to remove any films of acid adhering to the surface.

The detailed method used for removing the silica is as follows:

Treat about five grams of chrome ore through 200 mesh per linear inch in a platinum crucible or dish with 5 cc. of dilute sulphuric acid (containing equal volumes of water and concentrated sulphuric acid) followed by 15 to 20 cc. of 50% hydrofluoric acid in water. Heat on an electric hot plate with occasional stirring by means of a platinum wire for a half hour. Pour the contents of the crucible into a 400 cc. beaker containing about 100 cc. of dilute hydrochloric acid (equal volumes of concentrated hydrochloric acid and water). Boil for a few minutes, allow to settle and decant the supernatant liquid.

Add 100 cc. of hot water, stir and again allow to settle and decant. Repeat this water washing about four to five times. Finally dry the residue and heat gently to 200 to 300° C. to remove any acid films still adhering to the chromite grains. It should be kept in mind that this removal of silica is an analytical method used in the pretesting of the materials, and that it is not intended that silica will be removed from the actual chrome ore used in accordance with the present invention.

The following typical analyses are given for Phillipine chrome ore before and after this treatment to remove the silicate phase:

|  | Phillipine Ore | |
|---|---|---|
|  | Before Treatment | After Treatment |
|  | *Percent* | *Percent* |
| $SiO_2$ | 5.10 | 0.30 |
| $FeO$ | 12.83 | 13.99 |
| $Al_2O_3$ | 29.07 | 31.36 |
| $CaO$ | 0.17 | none |
| $MgO$ | 19.20 | 16.15 |
| $Cr_2O_3$ | 32.90 | 37.70 |
|  | 99.27 | 99.50 |

The mol ratio of $Al_2O_3$ plus $Cr_2O_3$ to $MgO$ in a typical purified spinel of one of the currently used chrome ores employed in making refractory brick is about 1.35 to 1. Such an ore is considered satisfactory for making refractory brick because of the relationship of these principal refractory oxides. The remaining oxides of iron may not all be present as FeO as indicated in the above analyses, but the iron may be considered as existing principally as an RO oxide, the ratio of total $R_2O_3$ to RO being approximately unity. Such a mol ratio of $Al_2O_3$ plus $Cr_2O_3$ to $MgO$ is typical of all the chrome ores which are considered acceptable for refractory brick manufacture.

Another type of chrome ore exists, however, which is characterized by a much higher ratio of its refractory oxides $Al_2O_3$ plus $Cr_2O_3$ to $MgO$. A typical ore of this character is mined in the Transvaal district of South Africa, and is available on the market in the chemical industry as "Transvaal chrome ore." It has not heretofore been possible to produce satisfactory refractory brick from chrome ores of the Transvaal type. Transvaal chrome ore has the following typical chemical analyses before and after treatment with sulphuric acid plus hydrofluoric acid and finally leaching with dilute hydrochloric acid to remove silica:

|  | Transvaal Ore | | |
|---|---|---|---|
|  | Before Treatment | | After Treatment |
|  | *Percent* | *Percent* | *Percent* |
| $SiO_2$ | 3.20 | 5 | 0.60 |
| $FeO$ | 24.59 | 26 | 25.81 |
| $Al_2O_3$ | 16.05 | 15 | 16.47 |
| $CaO$ | 0.10 | 0.10 | none |
| $MgO$ | 12.05 | 10 | 9.27 |
| $Cr_2O_3$ | 44.01 | 44 | 47.25 |
|  | 100.00 | 100.10 | 99.40 |

The mol ratio of $Al_2O_3$ plus $Cr_2O_3$ to $MgO$ in the spinel phase of the Transvaal chrome ore purified to remove silica is about 2.07 to 1.

The iron oxide in the Transvaal type of chrome ore exists principally as FeO (although some may be present as $Fe_2O_3$) and the FeO acts to restore the ratio of $R_2O_3$ to RO to approximately unity. Unfortunately, however, FeO is not a stable refractory oxide. Upon heating Transvaal chrome ore FeO oxidizes to $Fe_2O_3$ and the balance of $R_2O_3$ to RO in the spinel shifts, with disastrous results to the properties of the refractory. Upon heating Transvaal chrome ore to about 1400° C. the effect of such oxidation is evidenced by the appearance of $Fe_2O_3$ under petrographic examination. Furthermore the X-ray diffraction of the purified chrome ore before heating shows a definite spinel pattern with no significant unidentified lines. After heating, however, while the spinel lines still remain, numerous other lines appear indicating change in the oxide balance in the crystal of the spinel from Transvaal chrome ore.

Thus the chrome spinel from such a chrome ore having a deficiency of refractory $MgO$ in the RO portion so that the molar ratio of $Al_2O_3$ plus $Cr_2O_3$ to $MgO$ exceeds 1.75 is not acceptable for the manufacture of refractory brick. In fact Transvaal chrome ore is not used for such purposes.

An extensive study has been made by me of the behavior of chrome ore of the Transvaal type at high temperatures, and I have found as a result of such study that upon heating such ores in the presence of magnesia to temperatures of about 1300 to 1400° C. a remarkable change occurs. The magnesia is actually absorbed by the crystalline spinel phase, which changes its character. For example, heating 75 percent of purified Transvaal chrome ore with 25 percent of magnesia to 1400° C. for 5 hours and then treating the product with a 50 percent solution of hydrochloric acid to remove magnesia or other constituents foreign to the spinel phase, the spinel phase has been found to have increased in magnesia content to about 24 to 25 percent, and the molar ratio of $Al_2O_3$ plus $Cr_2O_3$ to $MgO$ has become less than unity. By this action the possible damage done by FeO is minimized and a refractory phase is formed in which the balanced ratio of the $R_2O_3$ to RO is achieved by stable refractory oxides, while the shifting of the iron by oxidation from FeO to $Fe_2O_3$ is counteracted by the magnesia added. The X-ray diffraction reveals a definite spinel pattern in the higher magnesia crystal.

Thus by the above described action of magnesia I am able to make Transvaal chrome ores available for refractory brick manufacture, whereas they have heretofore been considered unsuitable.

I have discovered that this method of making Transvaal chrome ore suitable for refractory brick manufacture is particularly desirable in the manufacture of refractory brick which are suited for use without kiln firing. These are sold as so-called unfired brick. In the processing of brick suitable for use without kiln firing, one of the principal difficulties is the linear shrinkage which occurs when the unfired brick are subjected to the high furnace temperatures during use. I have discovered that bricks based on Transvaal chrome ore to which magnesia has been added to correct the ratio of $R_2O_3$ to RO are free from such shrinkage. At high temperature the FeO is oxidized and the MgO enters the chrome crystal, thereby causing it to expand somewhat, and this overcomes the tendency to shrink otherwise present in such unfired brick. The net result is a brick with substantially no natural shrinkage during heating of the unfired brick to furnace temperature.

I have found that an unfired brick made from Transvaal chrome ore and magnesia develops a better ceramic bond upon initial heating during use because the oxidation of the FeO causes the formation of $Fe_2O_3$ which in the presence of magnesia forms $MgO.Fe_2O_3$, which greatly improves the bond and thereby improves the intermediate temperature strength of the brick.

Because of these peculiar characteristics of Transvaal chrome ore I prefer to use it in chrome brick suitable for use without kiln firing.

I find that chrome ore of the Transvaal type as described above is really very satisfactory for making refractory brick if the special precautions of the present invention are employed. The presence of silica impurities is not objectionable and I do not find it desirable to remove silica by chemical means in making commercial brick, as I did in studying the behavior of the spinel phase.

The chrome ore is crushed and screened to form coarse particles which pass a Tyler standard screen of about 6 mesh per linear inch and rest on a screen of about 28 mesh per linear inch. I prefer to use 65 percent of such coarse chrome particles with 35 percent of magnesia fine particles ground to pass a screen of at least Tyler standard 48 mesh per linear inch.

The magnesia used should be dead-burned natural magnesite or periclase prepared by calcining magnesium hydrate (prepared from sea water or brine) at temperatures of about 1600° C. A typical analysis of such sea water magnesia is:

| | Per cent |
|---|---|
| Ign. loss | 0.0 |
| $SiO_2$ | 3.0 |
| $Fe_2O_3$ | 2.0 |
| $Al_2O_3$ | 1.3 |
| CaO | 3.4 |
| MgO by diff. | 90.3 |
| | 100.0 |

I add moisture and a bonding agent such as sulphuric acid, sodium acid sulphate, magnesium sulphate, magnesium chloride, sulphite liquor or other organic bonding agent. The quantity of bond used is ordinarily of the order of 1 percent but in any case will not exceed 5 percent of the brick, after removal of the water by drying. The tempered brick mixture is pressed into brick form using a molding pressure desirably in excess of 5,000 p. s. i., preferably 10,000 p. s. i. or more. The pressed brick are dried to remove moisture and develop the bond.

If desired the brick may be treated with carbon dioxide gas under pressure preliminary to drying to improve the bond. This is described in my U. S. Patent No. 2,547,323, granted April 3, 1951, for Unburned Refractory Brick Making.

For certain uses I may comold the refractory brick with steel sheets pressed on the principal faces in accordance with my U. S. Patents Nos. 2,247,376 and 2,289,911.

The brick produced according to the present invention are useful for all high temperature furnaces where chrome-magnesite brick are employed, as for example open hearth steel furnaces, copper smelting furnaces, and other high temperature melting, smelting and refining furnaces.

The preferred composition of the brick is 65 percent of coarse Transvaal chrome ore particles of the size range previously mentioned, and 35 percent of fine magnesia particles of the size range previously mentioned. The amount of magnesia in the fine particles may however be decreased to 25 percent or even 20 percent of the brick. One manner of accomplishing this is to substitute chrome ore particles passing through 48 mesh per linear inch for the fine magnesia particles in excess of 20 percent of the brick; for example building up the 35 percent of fine particles by employing 20 percent of fine magnesia particles and 15 percent of fine chrome particles.

On the other hand, the amount of fine magnesia particles can be increased to 40 percent or even 50 percent of the brick, correspondingly reducing the quantity of coarse particles to 60 percent or even 50 percent (the coarse particles being ordinarily coarse Transvaal chromite).

The coarse chrome ore may be replaced by coarse magnesia passing through 6 or preferably 8 Tyler standard mesh per linear inch, and resting on a 28 mesh screen, retaining as little as 20 percent of coarse Transvaal chromite particles and using coarse magnesia particles to increase the quantity of coarse particles to for example 65 percent.

Thus it will be seen that the quantity of Transvaal chromite may vary between 80 percent and 20 percent of the brick and the quantity of magnesia may vary between 20 percent and 80 percent of the brick, while the quantity of coarse particles may vary between 50 and 80 percent of the brick (the coarse particles being either Transvaal chromite or Transvaal chromite and magnesia within the limits set forth) and the quantity of fine particles may vary between 20 and 50 percent of the brick (the fine particles being magnesia or a mixture of Transvaal chromite and magnesia within the limits set).

In the cases of the percentages of the composition of the brick, the percentages are by weight, based upon the refractory material present ignoring the bond, which is in any case of the order of 1 percent and not exceeding 5 percent of the brick.

The procedure used in the present invention produces a brick of increased strength or high modulus of rupture without burning and suitable for use in the unfired condition. For example, a brick containing 65 percent of Transvaal chrome ore and 35 percent of sea water magnesia on reheating to 1650° C. for five hours showed no permanent shrinkage but had a desirable linear expansion of about 1 percent. This brick compares very favorably with those heretofore made fro mthe so-called refractory chrome ore, such as Cuban, Philippine, or Turkish chrome ore, which for making refractory brick where Transvaal chrome ore has theretofore been supposed to be unsuitable.

In view of my invention and disclosure, variations and modifications to meet individual whim or particular need will doubtless become evident to others skilled in the art to obtain all or part of the benefits of my invention without copying the process and product shown, and I, therefore, claim all such insofar as they fall within the reasonable spirit and scope of my claims.

Having thus described my invention what I claim as new and desire by Letters Patent is:

1. The process of stabilizing chrome ore having a mol ratio of $Al_2O_3$ plus $Cr_2O_3$ to MgO exceeding 1.75 for refractory brick purposes, which comprises mixing chrome ore having a mol ratio of $Al_2O_3$ plus $Cr_2O_3$ to MgO exceeding 1.75 (the mol ratio determination having been made on a sample from which silica was removed) with magnesia in the proportions of 20 to 80 percent by weight of magnesia, and forming the mixture into a refractory brick.

2. The process of stabilizing chrome refractory made from chrome ore having a mol ratio of $Al_2O_3$ plus $Cr_2O_3$ to MgO exceeding 1.75, which comprises mixing with chrome ore having a mol ratio of $Al_2O_3$ plus $Cr_2O_3$ to MgO exceeding 1.75 (the mol ratio determination having been made on a sample from which silica was removed), from 20 to 80 percent by weight of magnesia, forming the mixture into a refractory brick without kiln firing and subjecting the refractory brick to firing temperature for the first time in the furnace during use.

3. The process of stabilizing chrome ore having a mol ratio of $Al_2O_3$ plus $Cr_2O_3$ to MgO exceeding 1.75 for brick manufacture, which comprises mixing together from 80 to 20 percent by weight of chrome ore having a mol ratio of $Al_2O_3$ plus $Cr_2O_3$ to MgO exceeding 1.75 (the mol ratio determination having been made on a sample from which silica was removed) and from 20 to 80 percent by weight of magnesia, the mixture including 50 to 80 percent by weight of coarse particles between 6 and 28 mesh per linear inch and 20 to 50 percent by weight of fine particles through 48 mesh per linear inch, from 20 to 50 percent by weight of the mixture being magnesia fine particles and incorporating the mixture into a refractory brick ready for use without kiln firing.

4. The process of making a stable refractory brick from chrome ore having a mol ratio of $Al_2O_3$ plus $Cr_2O_3$ to MgO exceeding 1.75, which comprises mixing about 65 percent by weight of coarse particles of chrome ore having a mol ratio of $Al_2O_3$ plus $Cr_2O_3$ to MgO exceeding 1.75 (the mol ratio determination having been made on a sample from which silica was removed), between 6 and 28 mesh per linear inch and about 35 percent by weight of magnesia fine particles through 48 mesh per linear inch, and incorporating the mixture into a refractory brick ready for use without kiln firing.

5. A non-acid refractory brick essentially consisting of from 80 to 20 percent by weight of chrome ore having a mol ratio of $Al_2O_3$ plus $Cr_2O_3$ to MgO exceeding 1.75 (the mol ratio determination having been made on a sample from which silica was removed) and from 20 to 80 percent by weight of magnesia.

6. A non-acid refractory brick essentially consisting of from 80 to 20 percent by weight of chrome ore having a mol ratio of $Al_2O_3$ plus $Cr_2O_3$ to MgO exceeding 1.75 (the mol ratio determination being made from a sample from which silica was removed) and from 20 to 80 percent by weight of magnesia made up from 50 to 80 percent by weight of coarse particles between 6 and 28 mesh per linear inch and from 20 to 50 percent by weight of fine particles through 48 mesh per linear inch.

7. An unfired non-acid refractory brick suitable for use in unfired condition essentially consisting of from 80 to 20 percent of chrome ore and consisting of from 50 to 80 percent of coarse particles between 6 and 28 mesh per linear inch and from 20 to 50 percent by weight of fine particles through 48 mesh per linear inch, at least 40 percent by weight of the particles of chrome ore having a mol ratio of $Al_2O_3$ plus $Cr_2O_3$ to MgO exceeding 1.75 (the mol ratio determination having been made on a sample from which silica was removed) and the balance being essentially magnesia, at least 20 percent by weight of the brick being magnesia fine particles.

8. An unfired non-acid brick suitable for use in unfired condition essentially consisting of 80 to 20 percent by weight of coarse particles of chrome ore having a mol ratio of $Al_2O_3$ plus $Cr_2O_3$ to MgO exceeding 1.75 (the mol ratio determination having been made on a sample from which silica was removed), ranging in size between 6 and 28 mesh per linear inch and between 20 and 50 percent by weight of magnesia particles through 48 mesh per linear inch.

9. An unfired non-acid refractory brick essentially consisting of about 65 percent by weight of coarse particles of chrome ore having a mol ratio of $Al_2O_3$ plus $Cr_2O_3$ to MgO exceeding 1.75 (the mol ratio determination having been made on a sample from which silica was removed) and ranging in size from 6 to 28 mesh per linear inch and about 35 percent by weight of magnesia particles through 48 mesh per linear inch.

RUSSELL PEARCE HEUER.

No references cited.